(12) United States Patent
Bouazizi (10) Patent No.: US 10,044,831 B2
(45) Date of Patent: Aug. 7, 2018

(54) METHOD AND APPARATUS FOR TRANSMITTING MESSAGES TO A DASH CLIENT

(71) Applicant: Samsung Electronics Co., Ltd., Suwon-si, Gyeonggi-do (KR)

(72) Inventor: Imed Bouazizi, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 378 days.

(21) Appl. No.: 14/643,959

(22) Filed: Mar. 10, 2015

(65) Prior Publication Data

US 2015/0256582 A1 Sep. 10, 2015

Related U.S. Application Data

(60) Provisional application No. 61/950,611, filed on Mar. 10, 2014.

(51) Int. Cl.
*H04L 29/08* (2006.01)
*H04L 29/06* (2006.01)

(52) U.S. Cl.
CPC .......... *H04L 67/32* (2013.01); *H04L 65/4084* (2013.01); *H04L 65/608* (2013.01); *H04L 67/02* (2013.01)

(58) Field of Classification Search
CPC ... H04L 67/32; H04L 65/4084; H04L 65/608; H04L 67/02
USPC ....................................................... 709/219
See application file for complete search history.

(56) References Cited

U.S. PATENT DOCUMENTS

| 2008/0092211 | A1 | 4/2008 | Klemets et al. |
| 2012/0110120 | A1* | 5/2012 | Willig ................ H04L 65/1016 709/217 |
| 2012/0124179 | A1 | 5/2012 | Cappio et al. |
| 2012/0207088 | A1* | 8/2012 | Liu .......................... H04L 67/02 370/328 |
| 2013/0173737 | A1* | 7/2013 | Liu .................. H04N 21/23439 709/213 |
| 2013/0247166 | A1 | 9/2013 | Freedman et al. |

(Continued)

OTHER PUBLICATIONS

ISO/IEC 23009-5, "Information Technology—Dynamic adaptive streaming over HTTP (DASH)—Part 5: Server and network assisted DASH (SAND)", ISO/IEC CD 23009-5, Feb. 19, 2015.*

(Continued)

*Primary Examiner* — Nicholas Taylor
*Assistant Examiner* — Chong G Kim (57) ABSTRACT

A client device communicates with a server to receive media streaming. The server detect a current media streaming session with the client device and determines a need to convey information regarding the ongoing media streaming session to the client device The server inserts a trigger in a hypertext transfer protocol (HTTP) response to a client device. The trigger is configured to indicate that a connection with the server is requested. The client device detects the trigger and verifies whether the server is a trusted server. After verifying that the server is trusted and the request is legitimate. The client device establishes a connection with the server and requests a message including information about the ongoing media streaming session. In response, the server sends a dynamic adaptive streaming over HTTP (DASH) message to the client device.

17 Claims, 6 Drawing Sheets

(56) References Cited

U.S. PATENT DOCUMENTS

| | | | |
|---|---|---|---|
| 2013/0262567 A1* | 10/2013 | Walker | H04L 69/329 709/203 |
| 2013/0275615 A1 | 10/2013 | Oyman | |
| 2013/0291082 A1* | 10/2013 | Giladi | H04L 63/123 726/7 |
| 2014/0281556 A1* | 9/2014 | Mao | H04L 63/126 713/176 |
| 2015/0032854 A1* | 1/2015 | Wang | H04L 65/60 709/219 |
| 2015/0113089 A1* | 4/2015 | Liu | H04N 21/23439 709/213 |
| 2015/0195328 A1* | 7/2015 | Rehan | H04L 65/608 709/219 |
| 2015/0195374 A1* | 7/2015 | Wang | H04L 65/601 709/219 |
| 2015/0200986 A1* | 7/2015 | Stockhammer | H04L 65/4069 709/219 |
| 2015/0271233 A1* | 9/2015 | Bouazizi | H04L 65/60 709/219 |
| 2015/0350205 A1* | 12/2015 | Oyman | H04L 63/126 726/7 |
| 2016/0006817 A1* | 1/2016 | Mitic | H04L 65/4076 709/232 |
| 2016/0198012 A1* | 7/2016 | Fablet | H04L 65/4084 709/231 |
| 2016/0219091 A1* | 7/2016 | Gabin | H04L 65/605 |
| 2016/0277466 A1* | 9/2016 | Lohmar | H04L 65/4076 |
| 2016/0301725 A1* | 10/2016 | Bouazizi | H04N 21/241 |
| 2017/0230434 A1* | 8/2017 | Wang | H04L 65/4076 |

OTHER PUBLICATIONS

International Search Report dated May 29, 2015 in connection with Application No. PCT/KR2015/002302, 3 pages.

Written Opinion of the International Searching Authority dated May 29, 2015 in connection with Application No. PCT/KR2015/002302, 9 pages.

* cited by examiner

METHOD AND APPARATUS FOR TRANSMITTING MESSAGES TO A DASH CLIENT

CROSS-REFERENCE TO RELATED APPLICATION(S) AND CLAIM OF PRIORITY

The present application claims priority to U.S. Provisional Patent Application Ser. No. 61/950,611, filed Mar. 10, 2014, entitled "METHOD AND APPARATUS FOR TRANSMITTING MESSAGES TO A DASH CLIENT". The content of the above-identified patent document is incorporated herein by reference.

TECHNICAL FIELD

The present application relates generally to media data delivery in a transmission system and, more specifically, to transmitting messages to a DASH client.

BACKGROUND

Traditionally, the Transmission Control Protocol (TCP) has been considered as not suitable for the delivery of real-time media such as audio and video content. This is mainly due to the aggressive congestion control algorithm and the retransmission procedure that TCP implements. In TCP, the sender reduces the transmission rate significantly (typically by half) upon detection of a congestion event, typically recognized through packet loss or excessive transmission delays. As a consequence, the transmission throughput of TCP is usually characterized by the well-known saw-tooth shape. This behavior is detrimental for streaming applications as they are delay-sensitive but relatively loss-tolerant, whereas TCP sacrifices delivery delay in favor of reliable and congestion-aware transmission.

Recently, the trend has shifted towards the deployment of the Hypertext Transport Protocol (HTTP) as the preferred protocol for the delivery of multimedia content over the Internet. HTTP runs on top of TCP and is a textual protocol. The reason for this shift is attributable to the ease of deployment of the protocol. There is no need to deploy a dedicated server for delivering the content. Furthermore, HTTP is typically granted access through firewalls and NATs, which significantly simplifies the deployment.

SUMMARY

In a first embodiment, a server is provided. The server includes an interface configured to couple to at least one client device. The server also includes processing circuitry. The processing circuitry is configured to detect a current media streaming session with the at least one client device. The processing circuitry is configured to determine a need to convey information regarding the current media streaming session to the at least one client device. The processing circuitry is configured to send a trigger to the at least one client device, the trigger configured to cause the at least one client device to establish a connection with the server and request a message containing the information. The processing circuitry is also configured to receive the connection with the at least one client device In a second embodiment, a device is provided. The device includes an antenna configured to establish a communication connection with a server. The device also includes processing circuitry. The processing circuitry is configured to detect a trigger requesting the communication connection with the server. The processing circuitry also is configured to detect a trigger requesting a connection with the server.

In a third embodiment, a method for a client device is provided. The method includes detecting a current media streaming session with at least one client device. The method includes determining a need to convey information regarding the current media streaming session to the at least one client device. The method includes sending a trigger to the at least one client device, the trigger configured to cause the at least one client device to establish a connection with the server and request a message containing the information. The method also includes receiving the connection with the at least one client device Other technical features may be readily apparent to one skilled in the art from the following figures, descriptions, and claims.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system.

Figure 1:
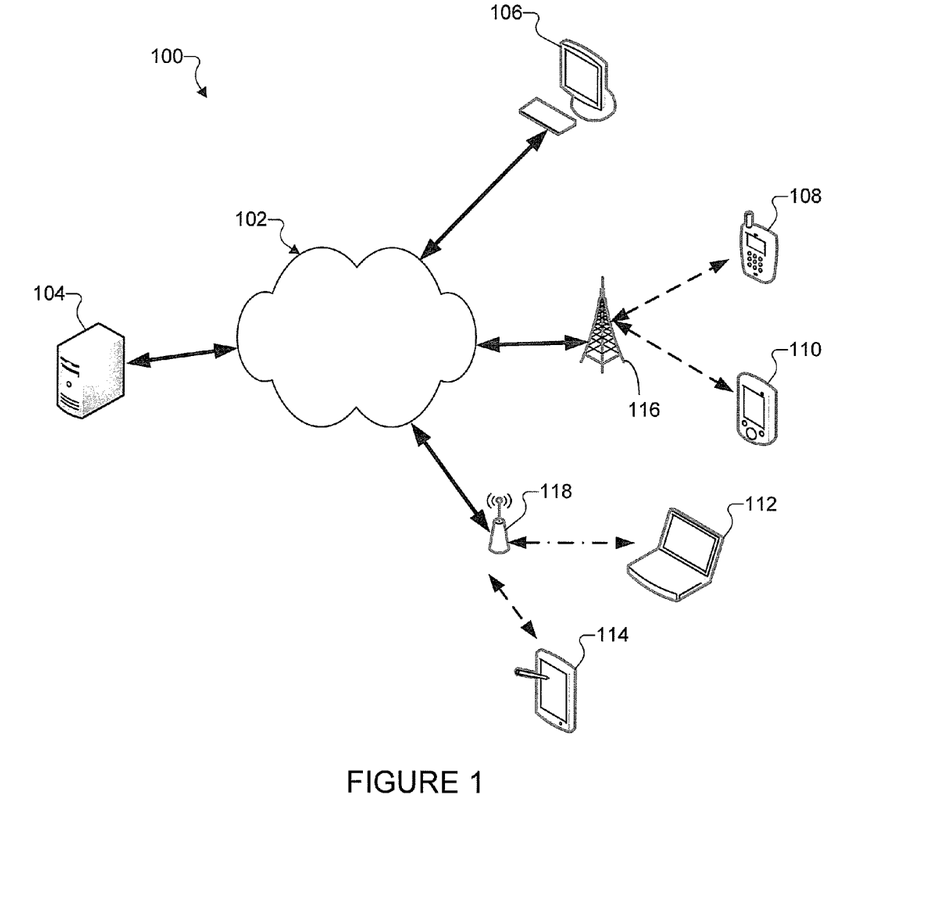
FIG. 1 illustrates an example computing system according to this disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-114. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices could be used in the computing system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

As described in more detail below, network 102 facilitates DASH-related messaging. One or more servers 104 are able trigger a receiver to establish a connection to the server, in order to transmit DASH-related messages. The respective client devices 106-114 then connect to the server 104 and receive DASH-related messages as they are pushed by the server 104.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
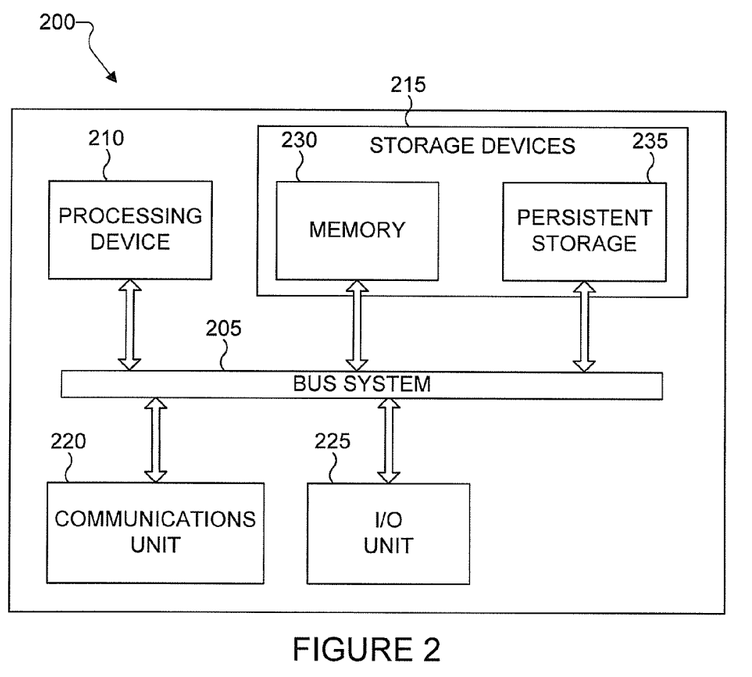
FIGS. 2 and 3 illustrate example devices in a computing system according to this disclosure.
Figure 3:
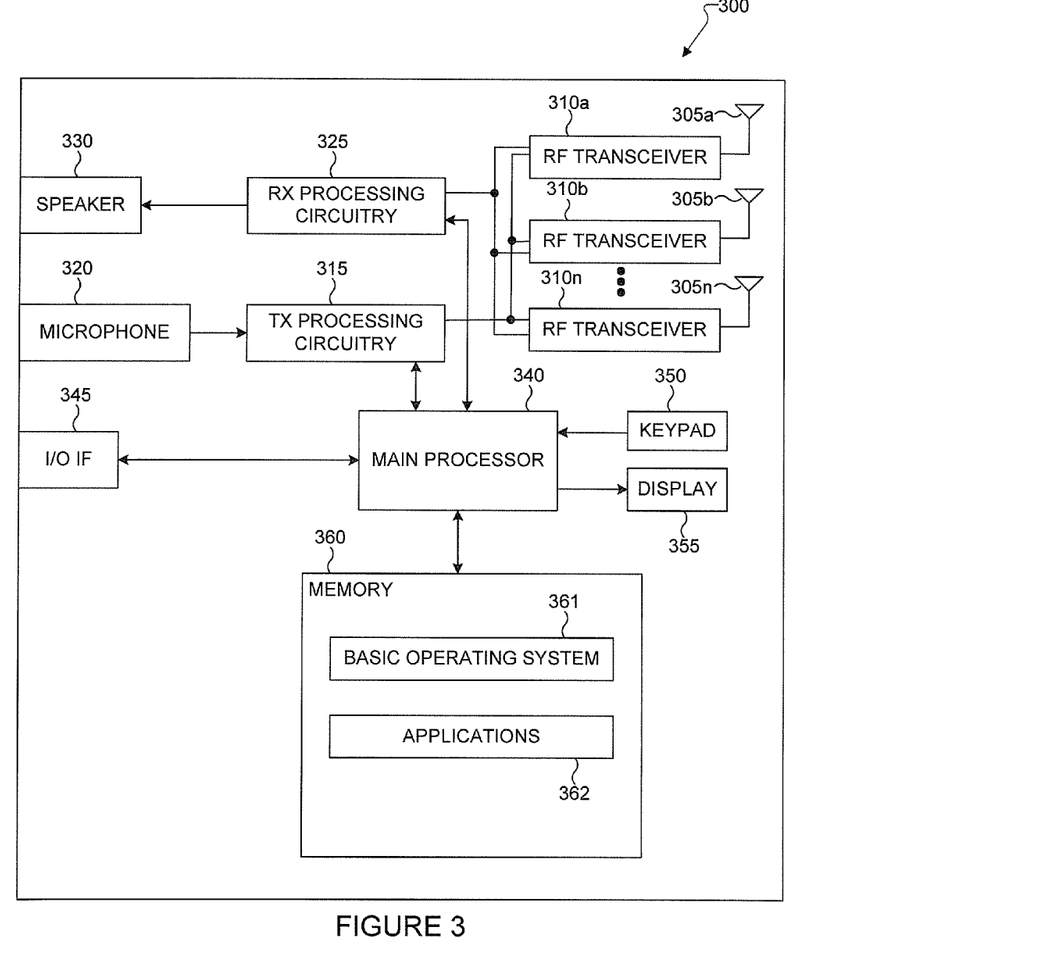

FIGS. 2 and 3 illustrate example devices in a computing system according to this disclosure. In particular, FIG. 2 illustrates an example server 200, and FIG. 3 illustrates an example client device 300. The server 200 could represent the server 104 in FIG. 1, and the client device 300 could represent one or more of the client devices 106-114 in FIG. 1.

As shown in FIG. 2, the server 200 includes a bus system 205, which supports communication between at least one processing device 210, at least one storage device 215, at least one communications unit 220, and at least one input/output (I/O) unit 225. The server 104 can be configured the same as, or similar to server 200. The server 200 is capable of triggering a receiver to establish a connection to the server, in order to transmit DASH-related messages.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include processing circuitry, a network interface card or a wireless transceiver facilitating communications over the network 102. The communications unit 220 may support communications through any suitable physical or wireless communication link(s). The communications unit 220 enables connection to one or more client devices. That is, the communications unit 220 provides an interface configured to couple to at least one client device.

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Note that while FIG. 2 is described as representing the server 104 of FIG. 1, the same or similar structure could be used in one or more of the client devices 106-114. For example, a laptop or desktop computer could have the same or similar structure as that shown in FIG. 2.

FIG. 3 illustrates an example STA 300 according to this disclosure. The embodiment of the STA 300 illustrated in FIG. 2 is for illustration only, and the STAs 104-112 of FIG. 1 could have the same or similar configuration. However, STAs come in a wide variety of configurations, and FIG. 3 does not limit the scope of this disclosure to any particular implementation of a STA.

The STA 300 includes multiple antennas 305a-305n, multiple radio frequency (RF) transceivers 310a-310n, transmit (TX) processing circuitry 315, a microphone 320, and receive (RX) processing circuitry 325. The TX processing circuitry 315 and RX processing circuitry 325 are respectively coupled to each of the RF transceivers 310a-310n, for example, coupled to RF transceiver 310a, RF transceiver 2310b through to a $N^{th}$ RF transceiver 310n, which are coupled respectively to antenna 305a, antenna 305b and an $N^{th}$ antenna 305n. In certain embodiments, the STA 104 includes a single antenna 305a and a single RF transceiver 310a. The STA 300 also includes a speaker 330, a main processor 340, an input/output (I/O) interface (IF) 345, a keypad 350, a display 355, and a memory 360. The memory 260 includes a basic operating system (OS) program 261 and one or more applications 262.

The RF transceivers 310a-310n receive, from respective antennas 305a-305n, an incoming RF signal transmitted by an AP 102 of the network 100. The RF transceivers 310a-310n down-convert the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceivers 310a-310n receive the outgoing processed baseband or IF signal from the TX processing circuitry 315 and up-converts the baseband or IF signal to an RF signal that is transmitted via one or more of the antennas 305a-305n.

The main processor 340 can include one or more processors or other processing devices and execute the basic OS program 361 stored in the memory 360 in order to control the overall operation of the STA 300. For example, the main processor 340 could control the reception of forward channel signals and the transmission of reverse channel signals by the RF transceivers 310a-310n, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for receiving DASH-related messages from a server. The main processor 340 can move data into or out of the memory 360 as required by an executing process. In some embodiments, the main processor 340 is configured to execute the applications 362 based on the OS program 361 or in response to signals received from AP 102 or an operator. The main processor 340 is also coupled to the I/O interface 345, which provides the STA 300 with the ability to connect to other devices such as laptop computers and handheld computers. The I/O interface 345 is the communication path between these accessories and the main controller 340.

The main processor 340 is also coupled to the keypad 350 and the display unit 355. The operator of the STA 300 can use the keypad 350 to enter data into the STA 300. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2 and 3 do not limit this disclosure to any particular client device or server.

Dynamic Adaptive Streaming over HTTP (DASH) has been standardized recently by 3GPP and MPEG. Several other proprietary solutions for adaptive HTTP Streaming such HTTP Live Streaming (HLS) by APPLE® and Smooth Streaming by MICROSOFT® are being commercially deployed nowadays. In contrast, DASH is a fully open and standardized media streaming solution, which drives interoperability among different implementations.

Figure 4:
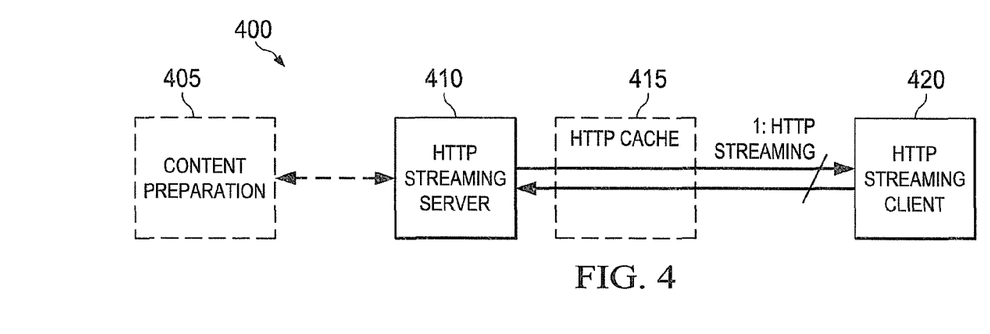
FIG. 4 illustrates adaptive HTTP Streaming Architecture according to embodiments of the present disclosure.

FIG. 4 illustrates adaptive HTTP Streaming Architecture according to embodiments of the present disclosure. The embodiment of the HTTP Streaming Architecture 400 shown in FIG. 4 is for illustration only. Other embodiments could be used without departing from the scope of the present disclosure.

In the HTTP Streaming Architecture 400, content is prepared in a content preparation 405 step. The content is delivered by an HTTP streaming server 410. The HTTP streaming server 410 can be configured the same as, or similar to, the server 104. In streaming, the content is cached, or buffered, in HTTP cached 415 and further streamed to HTTP streaming client 420. The HTTP streaming client 420 can be one of the clients 106-114.

In DASH, a content preparation 405 step needs to be performed, in which the content is segmented into multiple segments. An initialization segment is created to carry the information necessary to configure the media player. Only then can media segments be consumed. The content is typically encoded in multiple variants, typically several bitrates. Each variant corresponds to a Representation of the content. The content representations can be alternative to each other or they may complement each other. In the former case, the client selects only one alternative out of the group of alternative representations. Alternative Representations are grouped together as an adaptation set. The client can continue to add complementary representations that contain additional media components.

The content offered for DASH streaming needs to be described to the client 420. This is done using a Media Presentation Description (MPD) file. The MPD is an XML file that contains a description of the content, the periods of the content, the adaptation sets, the representations of the content and most importantly, how to access each piece of the content. The MPD element is the main element in the MPD file. It contains general information about the content, such as its type and the time window during which the content is available. The MPD contains one or more Periods, each of which describes a time segment of the content. Each Period can contain one or more representations of the content grouped into one or more adaptation sets. Each representation is an encoding of the one or more content components and with a specific configuration. Representations differ mainly in their bandwidth requirements, the media components they contain, the codecs in use, the languages, and so forth.

Figure 5:
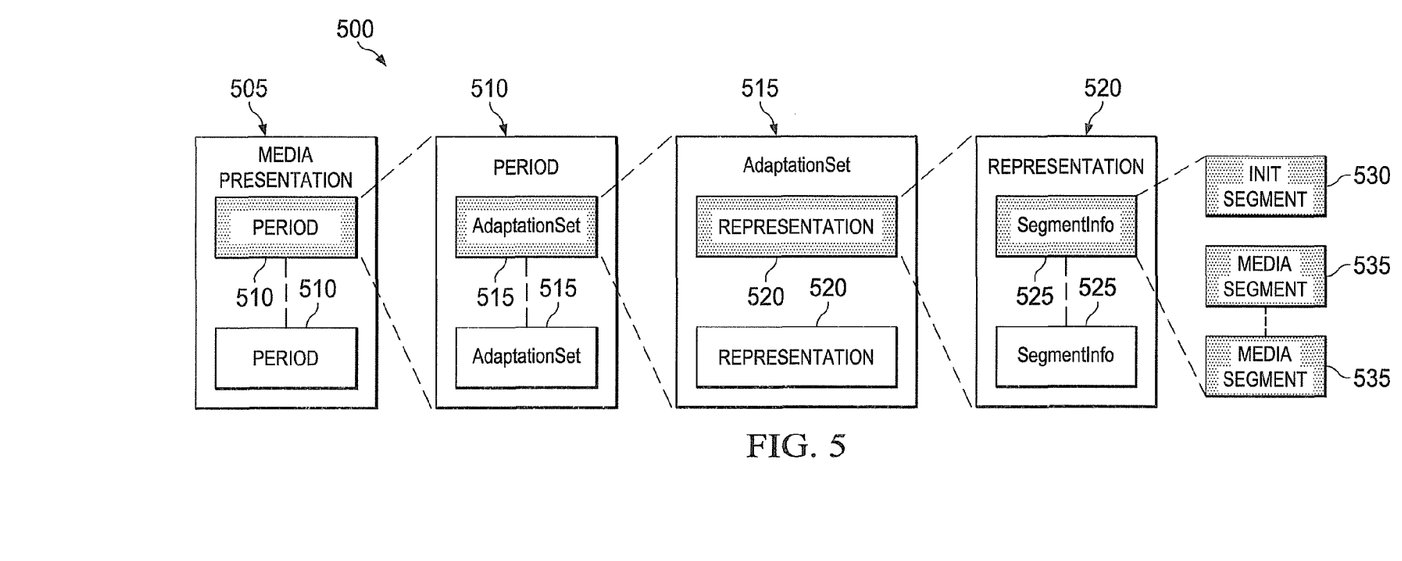
FIG. 5 illustrates an MPD structure according to embodiments of the present disclosure.

FIG. 5 illustrates an MPD structure according to embodiments of the present disclosure. The embodiment of the MPD structure 500 shown in FIG. 5 is for illustration only. Other embodiments could be used without departing from the scope of the present disclosure.

In the example shown in FIG. 5, the MPD structure 500 includes a media presentation 505 that has a number of periods 510. Each period 510 includes a number of adaptation sets 515. Each adaptation set 515 includes a number of representations 520. Each representation 520 includes segment information 525. The segment information 525 includes an initial segment 530 and a number of media segments 535.

In one deployment scenario of DASH, the ISO-base File Format and its derivatives (the MP4 and the 3GP file formats) are used. The content is stored in so-called movie fragments. Each movie fragment contains the media data and the corresponding meta data. The media data is typically a collection of media samples from all media components of the representation. Each media component is described as a track of the file.

Server-Sent Events

Server-sent events enable a web server, such as server 200, to send events to the browser in push mode. This is achieved through the use of a new element, the EventSource. The web application uses a long-held HTTP request to push the events to the receiver, such as client device 300. The event is a set of text blocks, where each block is a set of fields. The text blocks are separated by an empty line.

The Server-Sent Events can be used to send asynchronous events to the client devices 300. However, those events are in textual format and are, by consequence, limited in size.

Server and Network Assistance

In DASH, the DASH client is fully responsible for performing the rate adaptation based on the information in the MPD. As the MPD is generated and updated by the content provider, there is no possibility for intermediate nodes such as HTTP proxy servers or CDN nodes to have an impact on the rate adaptation at the client. However, there are many cases in which the network or intermediate nodes have information for the DASH client that will improve the end to end user experience. One example is the distribution of content over a content delivery network (CDN), where a particular Representation has already been cached by the CDN. If the client device 300 consumes that Representation, the end-to-end delay will be minimized and the overall quality may consequently be much better. This might be the case even if the cached Representation has a higher bandwidth requirement than the one the DASH client is currently consuming as the bottleneck may be in the core network.

In another use case, content can be distributed in a hybrid way over Broadcast and Broadband. However, only a selected set of Representations will be distributed over broadcast due to the fact that broadcast spectrum is costly and has to be used efficiently. In order to improve the end to end user experience, the broadcast receiver may want to tell the DASH client device 300 to consume a particular Representation as it is delivered over broadcast. Since Broadcast channels usually have a guaranteed bandwidth, this would give the DASH client the chance to receive a potentially high quality Representation without being burdened by estimating the available bandwidth and switching Representations.

Currently, there is no channel that would enable intermediate network nodes to communicate securely with the DASH client device 300. HTTP requires a request from the client device 300 to send a message from the server 200 to the client device 300. However, the client device 300 does not know or trust the intermediate node and without establishing a connection to the intermediate node, the messages cannot be conveyed to the DASH client device 300.

In the case of Server Sent Events (SSE), the request for the client device 300 to connect to the server 200 is hard coded as Javascript as part of the HTML5 page. An example of such a request is providing in the following:

var source=new EventSource("http://www.example.com/sse.php");
source.onmessage=function(event) {
// process event
}

In this example, the EventSource is initialized with the URL to the web server that will send messages to the web client.

As mentioned earlier, this solution is not suitable to communicate messages to the DASH client device 300 as the intermediate servers are usually not known to the content provider (or origin server).

The solution must enable any trusted intermediate node to send messages to the DASH client device 300.

Figure 6:
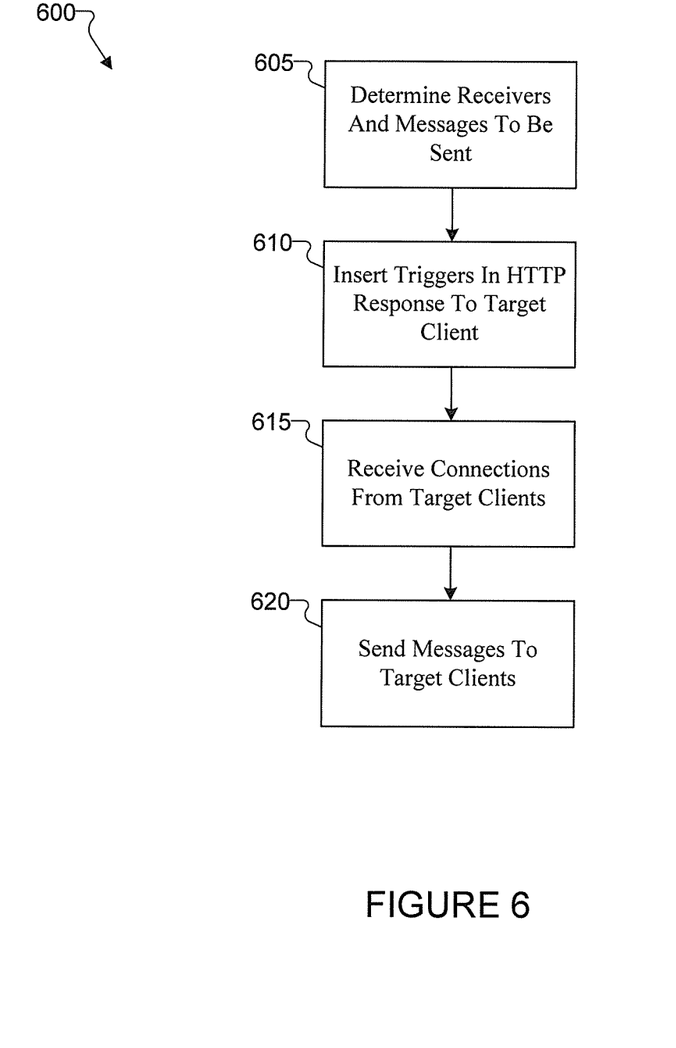
FIG. 6 illustrates a process for a server sending messages to a client device according to embodiments of the present disclosure.

FIG. 6 illustrates a process 600 for a server 200 sending messages to a client device 300 according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry in, for example, a server.

Embodiments of the present disclosure provide a method and apparatus to enable a server 200 to trigger a receiver, such as client device 300, to establish a connection to the server 200, in order to transmit DASH-related messages to the receiver. In certain embodiments, the server 200 is not necessarily already known to the client device 300. That is, the server 200 could be an initially transparent proxy server.

In block 605, the server 200 determines whether one or more messages need to be sent and to which receiver the messages should be sent. In block 610, the server 200 inserts a "trigger" in an HTTP response to the target client device 300. In certain embodiments, the server 200 embeds a trigger in the MPD to request that the DASH client device 300 connect to the server 200. In certain embodiments, the server 200 embeds a trigger in the DASH segment to request that the DASH client device 300 connect to the server 200. In certain embodiments, the server 200 signals to the client device 300 using a dedicated HTTP header field in an HTTP response to request that the DASH client device 300 connect to the server 200. In certain embodiments, the server 200 sends a trigger to the DASH client device 300 to request that the DASH client device 300 connect to the server 200 by using a dedicated HTTP Header Field. In certain embodiments, the server 200 adds an element to the MPD to signal that the client device 300 is requested to connect to the intermediate server. In certain embodiments, the server 200 includes the trigger as part of the response body to a DASH segment request. The trigger is either embedded inside the segment, such as by using the event messaging framework, or alternatively, the trigger is provided as part of a multi-part Multi-purpose Internet Mail Extensions (MIME) response with a dedicated MIME type.

In response to the client device 300 selecting, or otherwise activating or executing, the trigger, in block 615 the server 200 receives connections from the target client device 300.

In block 620, the server 200 sends the message to the target client device 300. It is noted that, in block 610, the server 200 can insert multiple triggers for a respective plurality of target client devices 300 and, in block 615, the server 200 can receive connections from one or more of the plurality of client devices in response to the activating of the respective triggers and send the respective messages to each respective target client device 300 in block 620.

Figure 7:
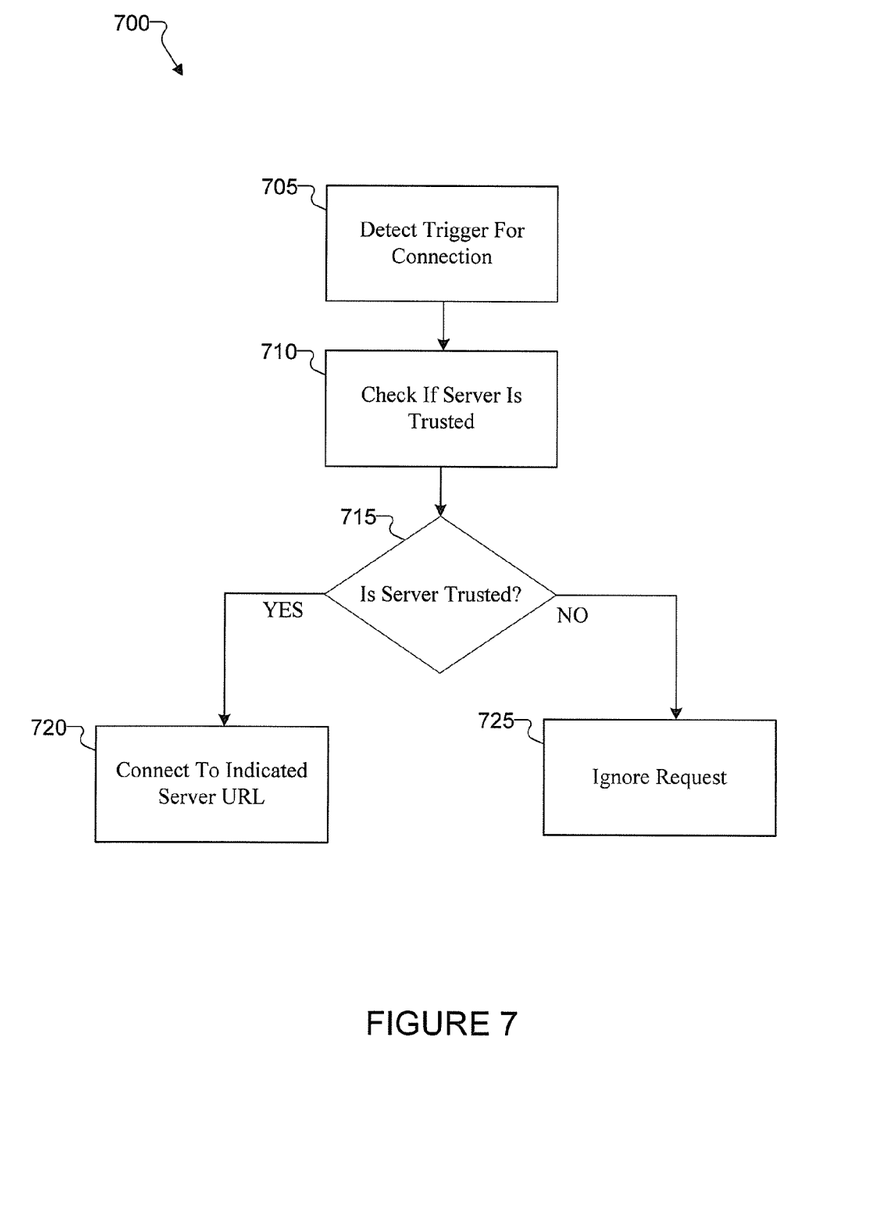
FIG. 7 illustrates a process for a client device receiving messages from a server according to embodiments of the present disclosure.

FIG. 7 illustrates a process 700 for a client device 300 receiving messages from a server 200 according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry in, for example, a client device.

In block 705, the client device 300 detects a trigger for connection to a server 200. In certain embodiments, the trigger is included in an HTTP response to the client device 300. In certain embodiments, the server 200 embeds a trigger in the MPD to request that the DASH client device 300 connect to the server 200. In certain embodiments, the server 200 embeds a trigger in the DASH segment to request that the DASH client device 300 connect to the server 200. In certain embodiments, the server 200 signals to the client device 300 using a dedicated HTTP header field in an HTTP response to request that the DASH client device 300 connect to the server 200. In certain embodiments, the server 200 sends a trigger to the DASH client device 300 to request that the DASH client device 300 connect to the server 200 by using a dedicated HTTP Header Field. In certain embodiments, the server 200 adds an element to the MPD to signal that the client device 300 is requested to connect to the intermediate server. In certain embodiments, the server 200 includes the trigger as part of the response body to a DASH segment request. The trigger is either embedded inside the segment, such as by using the event messaging framework, or alternatively, the trigger is provided as part of a multi-part MIME response with a dedicated MIME type.

In block 710, the client device 300 checks to see if the server 200 is a trusted server. In certain embodiments, upon receiving a request to connect to the intermediate server, a DASH client device 300 verifies that the server is a trusted server and whether the request is a legitimate request.

When the client devices determines in block 715 that the server 200 is trusted, the client device 300 connects to the indicated server uniform resource locator (URL) in block 720. When the client devices determines in block 715 that the server 200 is not trusted, the client device 300 ignores the request, such as by ignoring the trigger in block 725.

In certain embodiments, the server 200 embeds a trigger in the MPD to request that the DASH client device 300 connect to the server 200. In certain embodiments, the server 200 embeds a trigger in the DASH segment to request that the DASH client device 300 connect to the server 200. In certain embodiments, the server 200 signals to the client device 300 using a dedicated HTTP header field in an HTTP response to request that the DASH client device 300 connect to the server 200.

HTTP Header Field

In certain embodiments, the server 200 sends a trigger to the DASH client device 300 to request that the DASH client device 300 connect to the server 200 by using a dedicated HTTP Header Field. The HTTP Header Field can be defined as follows in Augmented Backus-Naur Form (ABNF) syntax:

X-Server-Event-Request="X-Server-Event-Request" ":" absolute-url CRLF

An example HTTP request may look as follows:
HTTP/1.1 200 OK
Date: Tue, 25 Feb. 2014 10:00:00 GMT
Content-Type: video/mp4s
Content-Length: 135465564
X-Server-Event-Request: http://www.example.com/serverevent.php Another example ABNF syntax for the header field can be as follows:

SAND-header-field="X-MPEG-SAND" ":" element-address element-address=absolute-URI The SAND header field provides the URI to the SAND message that is to be fetched by the DASH client device 300 using an HTTP GET method.

MPD

In certain embodiments, the server 200 adds an element to the MPD to signal that the client device 300 is requested to connect to the intermediate server.

DASH Segment

In certain embodiments, the server 200 includes the trigger as part of the response body to a DASH segment request. The trigger is either embedded inside the segment, such as by using the event messaging framework, or alternatively, the trigger is provided as part of a multi-part MIME response with a dedicated MIME type.

Trusted Server

In certain embodiments, upon receiving a request to connect to the intermediate server, a DASH client device 300 verifies if the server is a trusted server and if the request is a legitimate request.

This can be performed in one of the following ways:
 (a) IP address: IP address of the server 200 is in the same domain as the one of the client devices 300;
 (b) Base URL: the URL to the server 200 shares the same domain name as one of the Base URLs provided by the MPD;
 (c) Certificate: Using SSL/TLS to retrieve a certificate of the server 200 and verifies the authenticity of that certificate.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A server comprising:
 an interface configured to couple to at least one client device; and
 processing circuitry configured to:
  detect a current media streaming session with the at least one client device;
  determine a need to convey information regarding the current media streaming session to the at least one client device;
  send a trigger to the at least one client device, the trigger configured to cause the at least one client device to establish a connection with the server and request a message containing the information; and
  receive the connection with the at least one client device, wherein the trigger is included in an hypertext transfer protocol (HTTP) header field and wherein the HTTP header field is defined in Augmented Backus-Naur Form (ABNF) syntax comprising an absolute-URI of a message to be obtained by the at least one client device, the message stored on an intermediate server, and wherein the trigger is embedded in one of: a Media Presentation Description (MPD) HTTP response or a DASH segment HTTP response.

2. The server as set forth in claim 1, wherein:
an X-Server-Event-Request="X-Server-Event-Request" ":" absolute-url CRLF; or
a SAND-header-field="X-MPEG-SAND" ":" element-address, element-address=absolute-URI.

3. The server as set forth in claim 1, wherein the processing circuitry is configured to add an element to the MPD HTTP response, the element configured to signal that the at least one client device is requested to connect to an intermediate server.

4. The server as set forth in claim 1, wherein the processing circuitry is configured to embed the trigger in a dynamic adaptive streaming over HTTP (DASH) segment.

5. The server as set forth in claim 1, wherein processing circuitry is configured to determine to which ones of a plurality of client devices to send a respective message.

6. The server as set forth in claim 1, wherein the information determined by the processing circuitry relates to a state of media delivery by the server that comprises at least one of information indicating a presence of cached content at the server or an estimated bandwidth to the at least one client device.

7. A device comprising:
an antenna configured to establish a communication connection with a server; and
processing circuitry configured to:
detect a trigger requesting the communication connection with the server; and
in response to detecting the trigger and verifying that the server is a trusted server; connecting to the server,
wherein the trigger is included in an hypertext transfer protocol (HTTP) header field and wherein the HTTP header field is defined in Augmented Backus-Naur Form (ABNF) syntax comprising an absolute-URI of a message to be obtained by the device, the message stored on an intermediate server, and
wherein the trigger is embedded in one of: a Media Presentation Description (MPD) HTTP response or a DASH segment HTTP response.

8. The device as set forth in claim 7, wherein the HTTP header field comprises a SAND-header-field="X-MPEG-SAND" ":" element-address, element-address=absolute-URI.

9. The device as set forth in claim 7, wherein the trigger comprises an element added to the MPD HTTP response, the element configured to signal that the device is requested to connect to an intermediate server.

10. The device as set forth in claim 7, wherein the processing circuitry is configured to verify that the request is legitimate.

11. The device as set forth in claim 7, wherein when the processing circuitry determines that either the server is not trusted or the request is not legitimate, the processing circuitry is configured to ignore the trigger.

12. The device as set forth in claim 7, wherein, in response to connecting to the server, the processing circuitry receives information determined by the server that relates to a state of media delivery by the server and comprises at least one of information indicating a presence of cached content at the server or an estimated bandwidth to the device.

13. A method comprising:
detecting, at a server, a current media streaming session with at least one client device;
determining a need to convey information regarding the current media streaming session to the at least one client device;
sending a trigger to the at least one client device, the trigger configured to cause the at least one client device to establish a connection with a server and request a message containing the information; and
receiving the connection with the at least one client device,
wherein the trigger is included in an hypertext transfer protocol (HTTP) header field and wherein the HTTP header field is defined in Augmented Backus-Naur Form (ABNF) syntax comprising an absolute-URI of a message to be obtained by the at least one client device, the message stored on an intermediate server, and
wherein the trigger is embedded in one of: a Media Presentation Description (MPD) HTTP response or a DASH segment HTTP response.

14. The method as set forth in claim 13, wherein the HTTP header field comprises a SAND-header-field="X-MPEG-SAND" ":" element-address, element-address=absolute-URI.

15. The server as set forth in claim 14, wherein embedding further comprises adding an element to the MPD HTTP response, the element configured to signal that the at least one client device is requested to connect to an intermediate server.

16. The method as set forth in claim 13, further comprising determining which ones of a plurality of client devices to send a respective message.

17. The method as set forth in claim 13, wherein the information regarding the current media streaming session relates to a state of media delivery by the server that comprises at least one of information indicating a presence of cached content at the server or an estimated bandwidth to the at least one client device.

* * * * *